United States Patent
Hendricus Schrans

(12) United States Patent (10) Patent No.: US 6,726,275 B2
(45) Date of Patent: Apr. 27, 2004

(54) OPERATING MECHANISM FOR TWO PANEL-SHAPED ELEMENTS

(75) Inventor: Wilhelm Maria Theresia Hendricus Schrans, Nibuwecein (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/199,985

(22) Filed: Jul. 18, 2002

(65) Prior Publication Data

US 2003/0030304 A1 Feb. 13, 2003

(30) Foreign Application Priority Data

Jul. 25, 2001 (DE) .......................................... 10135988

(51) Int. Cl.⁷ ................................................ B60J 7/053
(52) U.S. Cl. .................... 296/214; 296/217; 296/220.01
(58) Field of Search .................................. 296/214, 217, 296/223, 220.01

(56) References Cited

U.S. PATENT DOCUMENTS

| | | | | |
|---|---|---|---|---|
| 4,844,534 A | * | 7/1989 | Boots ......................... | 296/214 |
| 5,069,500 A | * | 12/1991 | Reihl et al. ................. | 296/214 |
| 5,671,969 A | * | 9/1997 | Sutor et al. ................. | 296/214 |
| 6,457,770 B1 | * | 10/2002 | Pfalzgraf et al. ........... | 296/214 |

FOREIGN PATENT DOCUMENTS

| | | | | |
|---|---|---|---|---|
| DE | 3920073 | * | 1/1991 | .................. 296/214 |
| DE | 4141283 | * | 6/1993 | .................. 296/214 |
| JP | 100015 | * | 6/1984 | .................. 296/214 |
| JP | 11-217023 | | 8/1999 | |

* cited by examiner

Primary Examiner—Dennis H. Pedder
(74) Attorney, Agent, or Firm—Westman, Champlin & Kelly, P.A.; S. Koehler

(57) ABSTRACT

An operating mechanism for two panel-shaped elements which are movable, substantially in the plane in which they extend, between an operative position, in which they lie side by side in the same plane, and a parallel, stacked position, and which each co-operate with guideways by means of guide elements at their transverse sides extending parallel to the direction of movement. A first panel-shaped element is provided with a connecting pin, which engages in a curved guide track formed in the second panel-shaped element, which curved guide track is so configured that when a force is exerted on the second panel-shaped element for the purpose of moving said element, a force comprising a force component transversely to the guideways will be exerted on the connecting pin, and in that the guideways comprise a transverse guideway portion connecting thereto.

13 Claims, 5 Drawing Sheets

OPERATING MECHANISM FOR TWO PANEL-SHAPED ELEMENTS

BACKGROUND OF THE INVENTION

The invention relates to an operating mechanism for two panel-shaped elements which are movable, substantially in the plane in which they extend, between an operative position, in which they lie side by side in the same plane, and a parallel, stacked position, and which each co-operate with guideways by means of guide elements at their transverse sides extending parallel to the direction of movement.

An example of such panel-shaped elements are sun screens in an open roof construction for a vehicle. In their operative position, they lie side by side in the same plane, overlapping a roof opening formed in the roof of the vehicle. In this operative position, they perform their sun screen function. If the sun screens are not needed, they are moved in the guideways, substantially in the plane in which they extend, to their parallel, stacked position. An example of such an operating mechanism is shown inter alia in JP-11-217023.

It is an object of the present invention to further improve such an operating mechanism.

SUMMARY OF THE INVENTION

In order to accomplish that objective, the operating mechanism includes a first panel-shaped element that is provided with a connecting pin, which engages in a curved guide track formed in the second panel-shaped element. The curved guide track is so configured that when a force is exerted on the second panel-shaped element for the purpose of moving said element, a force comprising a force component transversely to the guideways will be exerted on the connecting pin. The guideways comprise a transverse guideway portion connecting thereto.

When, starting from the operative position of the panel-shaped elements, the second panel-shaped element is moved in the direction of the stacked position, the first panel-shaped element will be moved in the same direction together with the second panel-shaped element on the one hand, but on the other hand said force component transversely to the guideways will be exerted on the connecting pin at the same time. A corresponding movement transversely to the guideways of the first panel-shaped element supporting the connecting pin is initially prevented as a result of the cooperation between the guide elements thereof and the guideways. When the guide element of the first panel-shaped element reaches the transverse guideway portion, however, the aforesaid force component will cause the guide element in question to move into this transverse guideway portion, as a result of which the first panel-shaped element will be moved in a direction transversely to the guideways with respect to the second panel-shaped element. This makes it possible for the second panel-shaped element to be subsequently positioned beside the first panel-shaped element (in a stacked position).

Starting from the stacked position, in which the aforesaid guide element of the first panel-shaped element is present in the transverse guideway portion, an opposite movement of the second panel-shaped element in the direction of the operative position will result in a force component transversely to the guideways which is of opposite sense to the aforesaid force component. As a result, the aforesaid guide element will be moved out of the transverse guideway portion, after which the first panel-shaped element will move to the operative position together with the second panel-shaped element.

The movement into the transverse guideway portion of the guide element in question of the first panel-shaped element can be assisted in that the first panel-shaped element comprises two guide elements on each transverse side and in that the distance between one end of the guideways and the transverse guideways in question corresponds to the distance between said two guide elements.

Upon movement of the panel-shaped elements from their operative position to the stacked position, a guide element of the first panel-shaped element reaches the end of the guideway in question. At that point in time, the other guide element will be present at the location of the transverse guideway. In this way it is ensured that the latter guide element is actually moved into the transverse guideway and not past said guideway.

Furthermore it is advantageous if the curved guide track of the second panel-shaped element comprises a sloping starting portion and a portion connecting thereto, which extends parallel to the plane of the panel-shaped elements. The sloping starting portion provides the transverse force component, as a result of which the first panel-shaped element is moved in a transverse direction with respect to the second panel-shaped element. After this, the connecting pin will be positioned in the parallel end portion of the curved guide track, as a result of which the two panel-shaped elements will move past each other with an increasing degree of overlap, without any further changes in the spacing between the two elements occurring.

Furthermore, an embodiment of the operating mechanism according to the invention is possible in which the aforesaid end of the guideways, which is inclined, is present on the same side of the guideway in question as the transverse guideway portion. In this way a movement of the first panel-shaped element is effected in which not only the part thereof that is present at the location of the transverse guideway portion is moved in transverse direction, but also the part that is present at the end of the guideways. In this way, the first panel-shaped element is moved in a transverse direction as a whole.

At least a number of the guideways of the panel-shaped elements may be biased against the guideways. An example of this is a variant of an embodiment in which the guide elements of the second panel-shaped element consist of guide rollers biased by spring elements. As a result, it is inter alia possible to adjust the force required for moving, to compensate tolerances and to prevent the panel-shaped elements from vibrating undesirably and slanting with respect to the guideways.

In order to simplify the construction of the operating mechanism, it is further proposed that the guide elements of the two panel-shaped elements can engage in the same guideways. As a result, the number of guideways is reduced to a minimum.

Finally, a special embodiment of the operating mechanism according to the invention is mentioned in which the sides of the panel-shaped elements that face each other in the operative position thereof define a ventilating channel between them. This enables ventilation in the operative position of the space present under the panel-shaped elements.

In this framework it is furthermore preferred in that case if the aforesaid sides are configured such that the ventilating channel is curved so as to avoid the presence of a line of sight between the adjoining panel-shaped elements. In this way it is possible to prevent the entry of sunlight via the ventilation channel in an optimum manner, for example if the panel-shaped elements are sun screens.

The invention also relates to an open roof construction for a vehicle having a roof opening formed in the roof of the vehicle, which roof opening can be closed by at least one movable closure element, in which the closure element can be moved to a position in which the side thereof that extends transversely to a longitudinal axis of the vehicle and a correspondingly extending side of an adjoining portion of the open roof construction define a ventilation channel between them.

Preferably, said adjoining portion is also a movable closure element.

In this framework, the movable closure elements may be sun screens.

BRIEF DESCRIPTION OF THE DRAWINGS

The invention will be explained in more detail hereinafter with reference to the drawings, which show an embodiment of the operating mechanism according to the invention.

DETAILED DESCRIPTION OF THE ILLUSTRATIVE EMBODIMENTS

Figure 1:
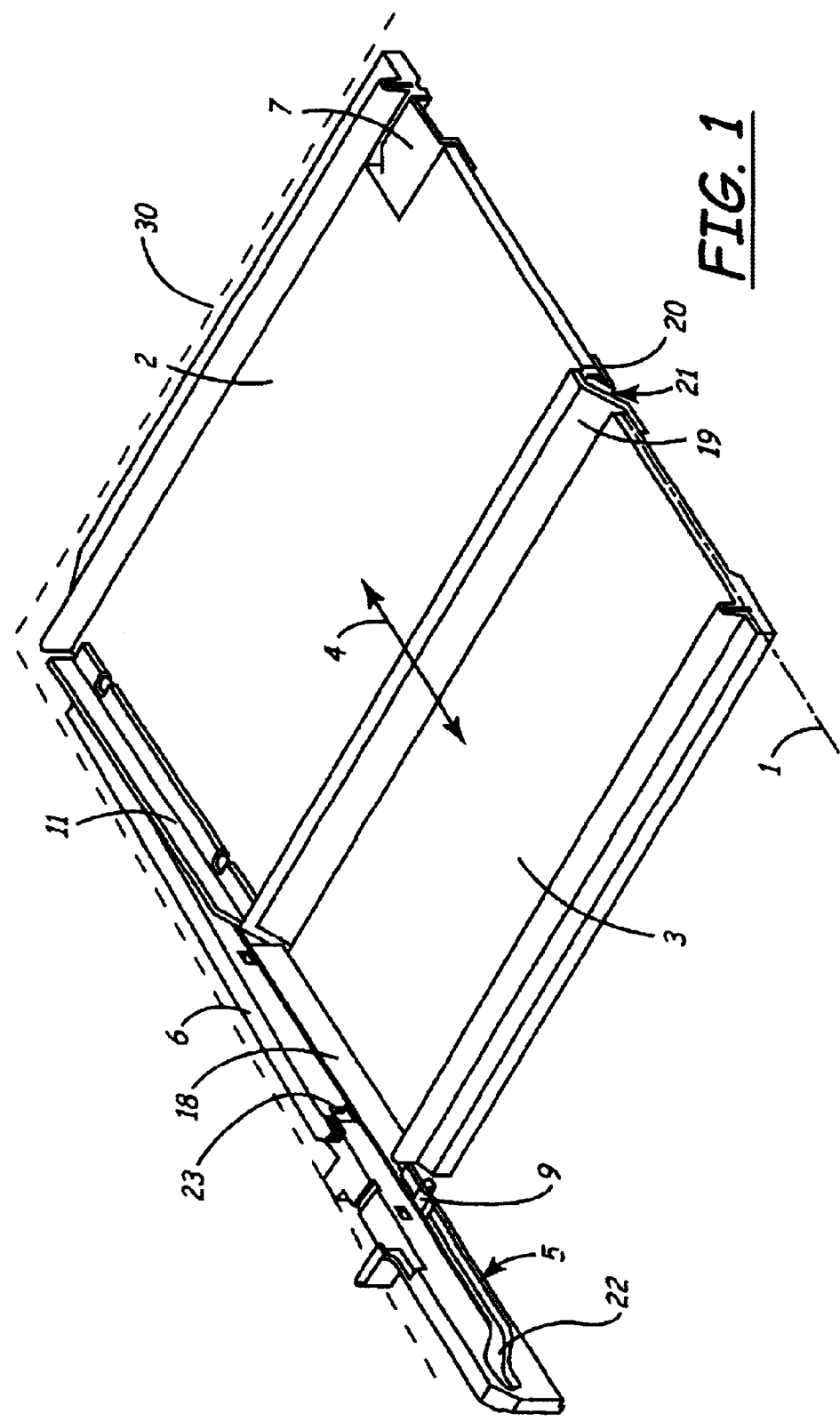
FIG. 1 is a perspective view of a part of an embodiment of the operating mechanism according to the invention.
Figure 2:
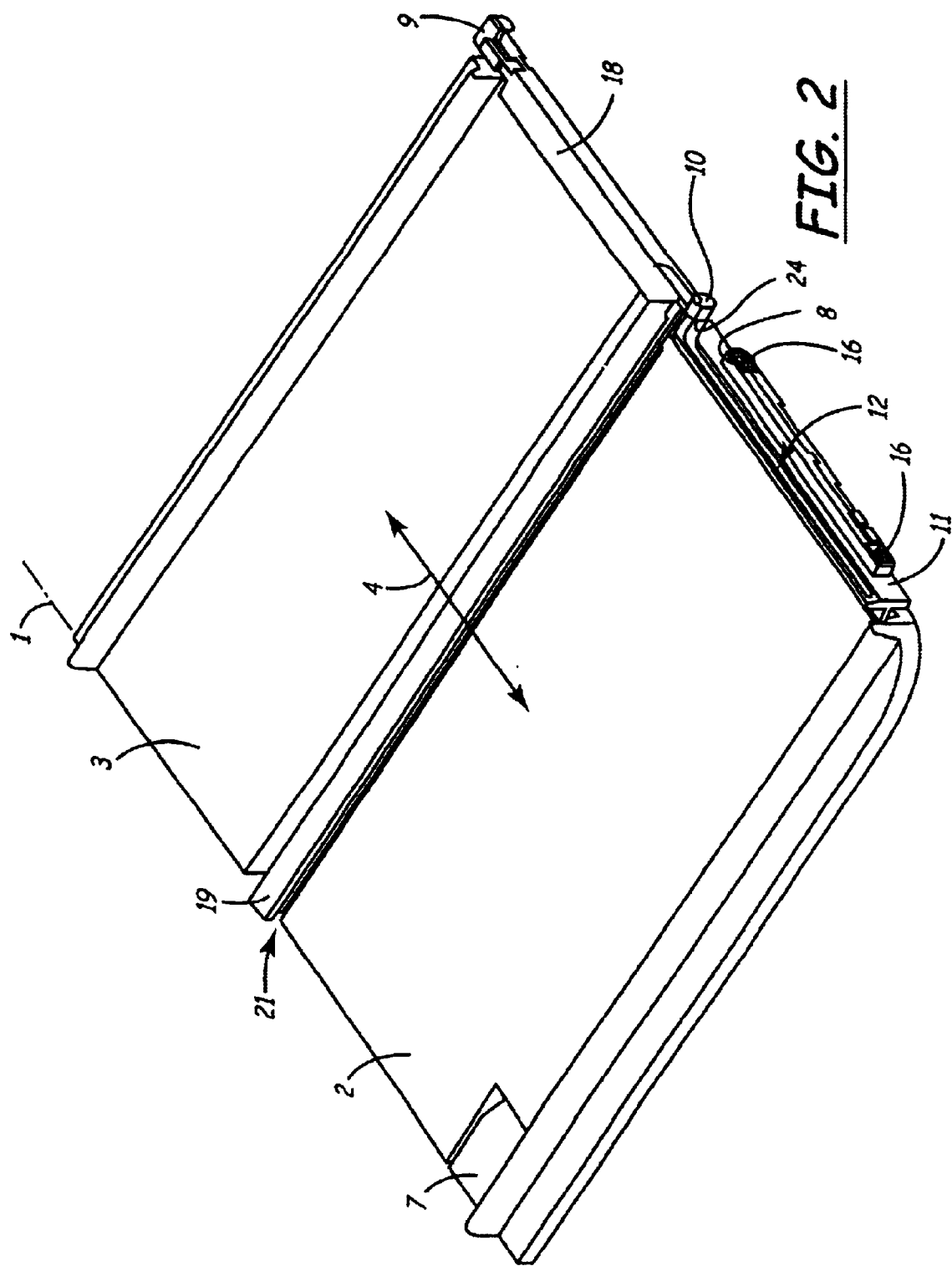
FIG. 2 is a perspective view of said embodiment, seen from an opposite side, however.
Figure 3:
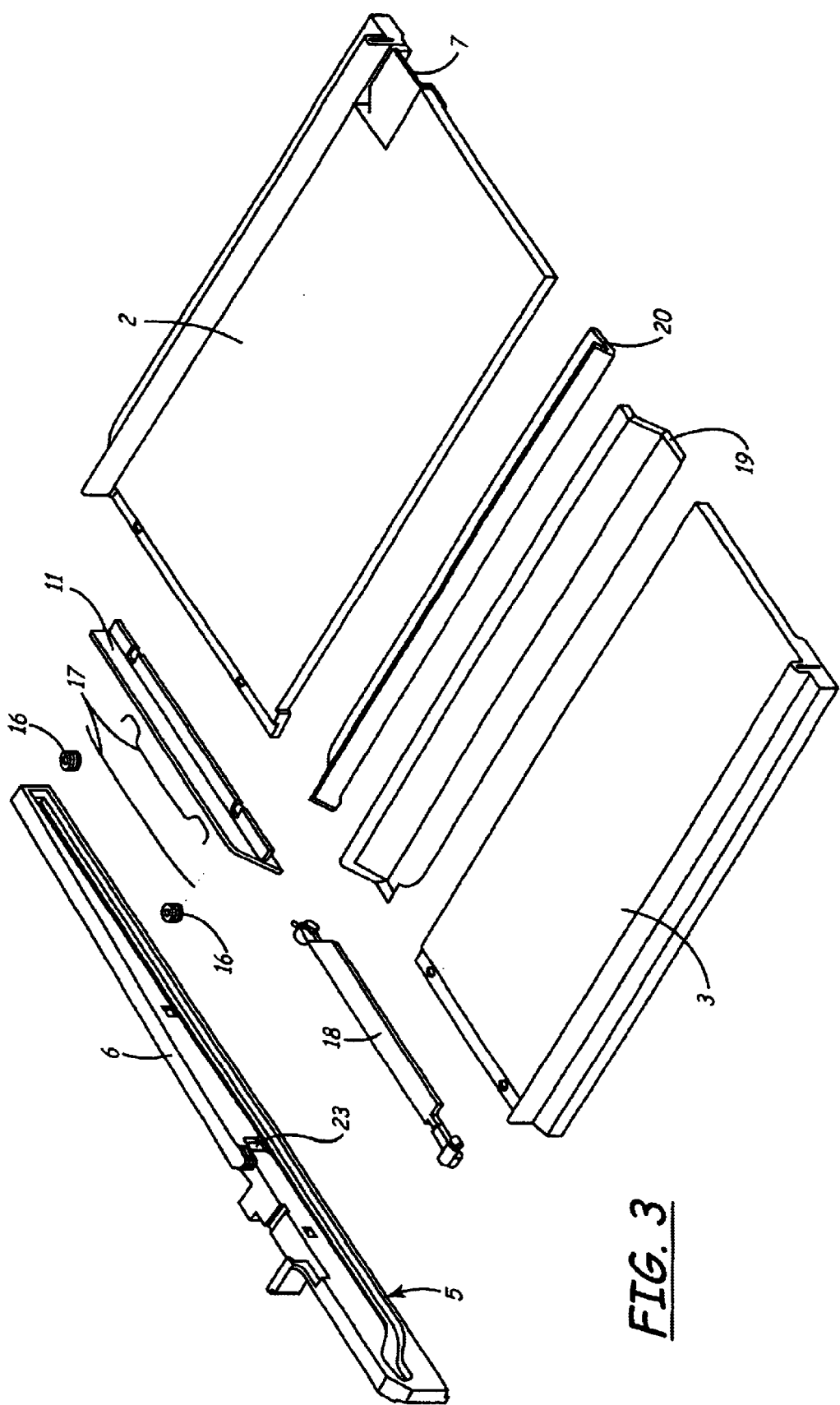
FIG. 3 is an exploded view, seen in a direction corresponding to FIG. 1.

Before entering into a detailed description of the figures, it is noted that only half of the operating mechanism in question is shown in each of the views of FIGS. 1, 2 and 3. The other half is a fully identical mirror image thereof. Thus, reference can be made to FIGS. 1 and 2 by way of example, which show a central axis 1 which forms the axis of symmetry of the operating mechanism in question.

Furthermore it is noted that the operating mechanism will be explained hereinafter by means of an example in which the panel-shaped elements are sun screens for an open roof construction of a vehicle.

Referring to FIG. 1, there is shown an embodiment of the operating mechanism according to the invention, which comprises two sun screens 2 and 3 which can be moved forward and backwards as indicated by the double arrow 4, substantially in the plane in which they extend, between an operative position, in which they lie side by side in the same plane (as shown in FIG. 1), and a parallel, stacked position (in the illustrated example the sun screen 2 will be positioned under the sun screen 3 in the stacked position).

The transverse sides extending parallel to the direction of movement 4 of the sun screens 2 and 3 co-operate with guideways 5, which are formed in guides 6, by means of guide elements yet to be described hereinafter. In the present embodiment, said guides 6 are attached to a fixed roof construction of the vehicle, proximate sides thereof forming a roof opening schematically indicated by dashed line 30.

FIG. 1 furthermore shows a part of a handle 7, which a user can take hold of for the purpose of moving the sun screens 2 and 3.

In the view according to FIG. 2, the guide 6 is not shown for the sake of a better view. As can be seen in the figure, the sun screen 2 is provided with a guide shoe 8, which is capable of engaging in the guideway 5 (FIG. 1). The sun screen 3 is provided with two guide cams 9 and 10, which are likewise intended for engagement in the guideway 5. Said guideway 5 is shown more clearly in the exploded view according to FIGS. 3 and 4.

Figure 5:
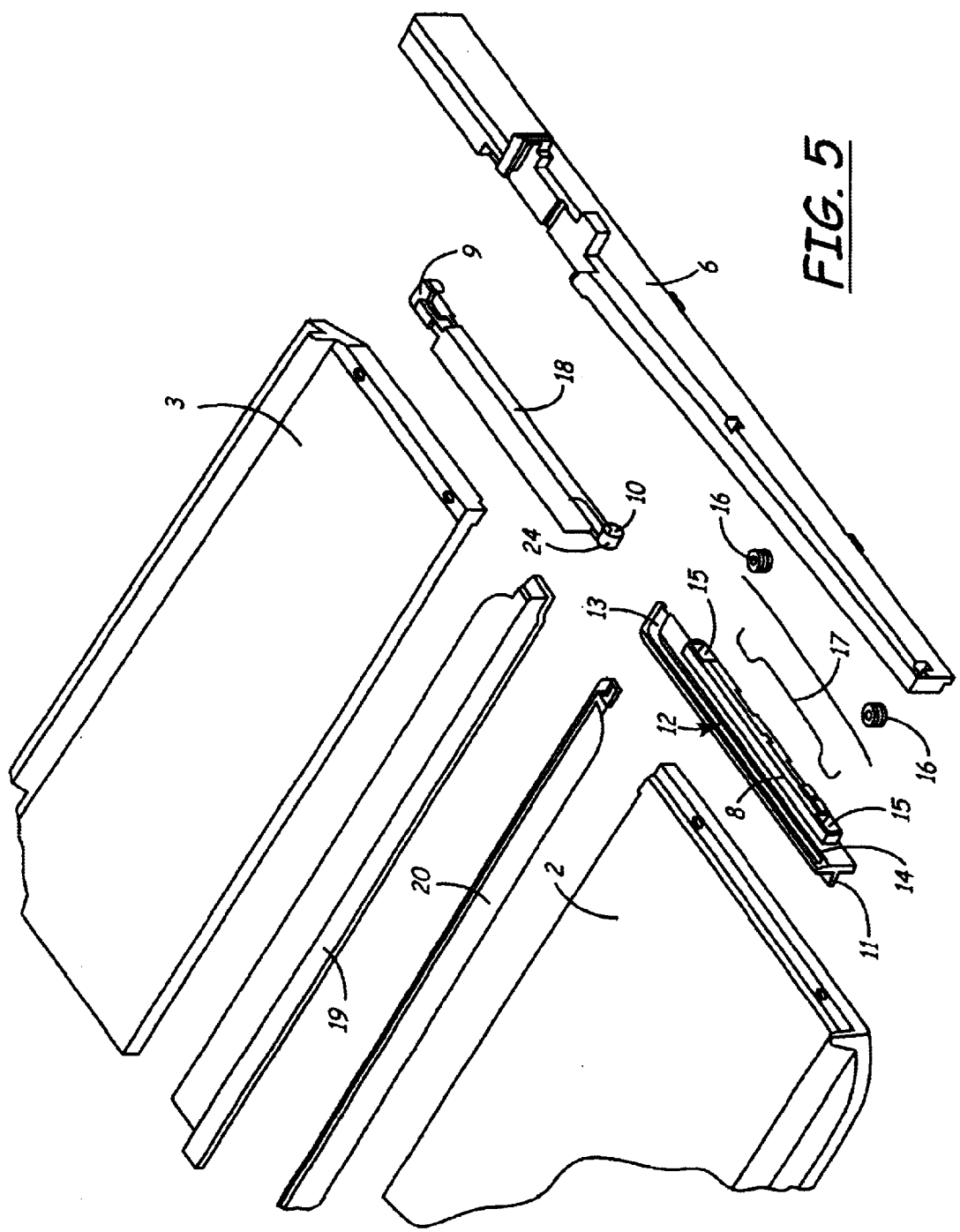
FIG. 5 is a larger-scale, exploded view of a part of the operating mechanism in question, seen in a direction corresponding to FIG. 2.

The component parts of the operating mechanism as shown will now be explained in more detail. The guide shoe 8 of the sun screen 2 is formed on a carrier 11, which is attached to the sun screen 2. A curved guide track 12 is recessed in said carrier 11, which curved guide track comprises a sloping starting portion 13 and an end portion 14 connecting thereto, which extends parallel to the plane of the sun screen 2 as illustrated in FIG. 5.

The guide shoe 8 is also provided with internal cavities 15 for accommodating guide rollers 16. Spring elements 17 engage the guide rollers 16 in the mounted position, so that said guide rollers engage in the guideway 5 of the guide 6 with a certain bias. As a result, a stable position of the sun screen 2 in the guideway 5 is effected.

The guide cams 9 and 10 of the other sun screen 3 are formed on a carrier 18, which can likewise be attached to the sun screen 3 by means of fixing elements (not shown). Said carrier 18 is also provided with an inwardly extending connecting pin 24, which is accommodated in the curved guide track 12 of the carrier 11 in the mounted position of the operating mechanism. Reference is made to FIG. 2 in this connection.

The sides of the sun screens 2 and 3 that face towards each other are provided with curved profiled elements 19 and 20, which, as is apparent from FIG. 1, form a ventilating channel between them, in which a line of sight between the adjoining sun screens 2 and 3 is not allowed, however. In this way, ventilation of the space present under the sun screens 2 and 3 is possible without direct incidence of sunlight.

Figure 4:
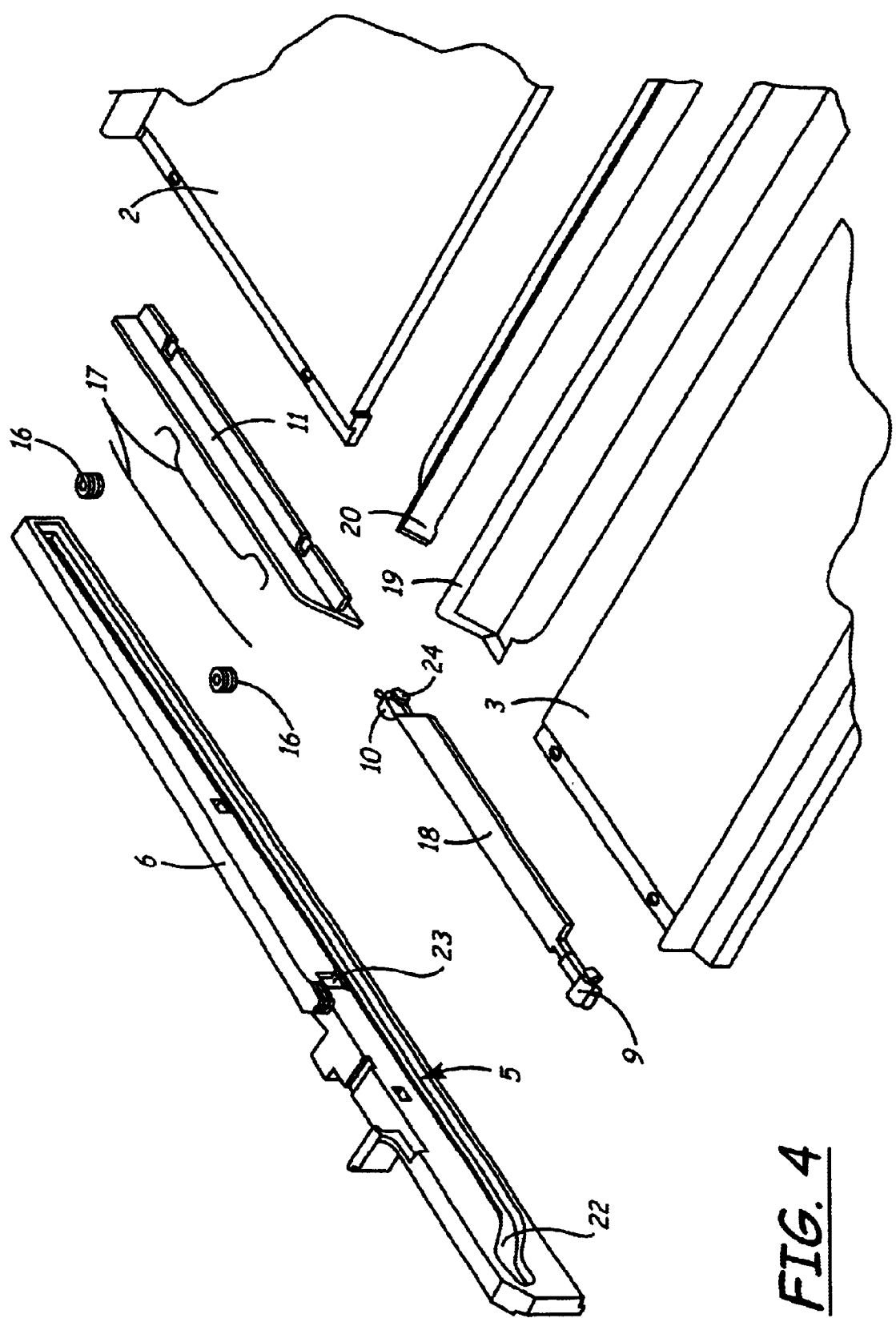
FIG. 4 is a larger-scale detail view of FIG. 3.

Referring inter alia to FIG. 4, the guideway 5 in the guide 6 comprises an upwardly sloping end portion 22 at one end. A transverse guideway portion 23 connects to the guideway 5 at a point some distance away from said end portion 22. The distance between said end portion 22 and the transverse guideway portion 23 corresponds substantially to the distance between the guide cams 9 and 10 of the sun screen 3.

The operating mechanism as shown works as follows. In a position corresponding to FIG. 1, the sun screens 2 and 3 lie side by side in the same plane, in which position they close a roof opening formed in the vehicle and in which they perform their sun screen function. Incidence of sunlight is not possible, whereas ventilation via the channel 21 formed between the sun screens 2 and 3 is allowed. When the sun screens 2 and 3 are to be moved from the so-called operative position as shown in FIG. 1 to a parallel, stacked position (in which, in this case, the sun screen 2 is positioned under the sun screen 3), a force generally to the left, seen in FIG. 1, is exerted on the handle 7 by hand, as a result of which the sun screen 2 will move to the left. This movement of the sun screen 2 is transmitted to the connecting pin 24, and consequently to the sun screen 3, by means of the sloping starting portion 13 of the curved guide track 12. As a result, the two sun screens 2 and 3 will jointly move to the left toward end portion 22.

As a result of the slope of the starting portion 13, the connecting pin 24 is also subjected to a force comprising a component transversely to the guideway 5, which force attempts to move the connecting pin 24 in a transverse direction. Initially, however, such movement is prevented because the guide cam 10 is retained in the guideway 5. Once the assembly of sun screens 2 and 3 has been moved sufficiently far to the left (as shown in FIG. 1), however, the guide cam 10 will reach the transverse guideway portion 23. At the same time, the guide cam 9 has reached the end of the sloping end portion 22 of the guideway 5. On the one hand, further movement to the left of the sun screen 3 is prevented in this manner, while on the other hand the guide cam 10 is now moved into the transverse guideway portion 23 as a result of the aforesaid force component transversely to the guideway 5. As a result, the sun screen 3 is lifted with respect to the sun screen 2 and maintained in this position. In the meantime, the connecting pin 24 has moved into the straight end portion 14 of the curved guide track 12 that extends parallel to the plane of the sun screen 2, so that the sun screen 2 can slide under the sun screen 3 without impediment.

In a reverse order, starting from the stacked position of the sun screens 2 and 3 that has been reached in this manner, the connecting pin 24 is subjected to an opposite force component transversely to the guideway 5 after said connecting pin 24 has reached the sloping starting portion 13 of the curved guide track 12, as a result of which the sun screen 3 will move downwards again. After the guide cam 10 has exited the transverse guideway portion 23 in this way, the guide cam 9 will move downwards from the sloping end portion 22 of the guideway 5 upon movement to the right (in that case) of the sun screen 3. As a result, the two sun screens 2 and 3 will be positioned in the same plane again, after which they will be jointly moved to the right (as shown in FIG. 1).

The operating mechanism as shown provides a number of important advantages. While a large roof opening can be covered in the operative position, a compact assembly is obtained in the stacked position. The bias of the guide elements against the guideways provides tolerance compensation, while the amount of play can be kept as small as possible and undesirable vibrations can be prevented. In addition to that, the sun screens 2 and 3 can be prevented from slanting. Furthermore, this makes it possible to adjust a desired frictional force or slide resistance (to which end also additional friction elements may be used).

As a result of the special configuration of the facing sides of the sun screens, an optimum ventilating possibility is provided without there being a need to form openings in the sun screens themselves for this purpose, which openings may have a weakening effect on the construction.

Finally, the component parts of the operating mechanism are fully symmetrical, thus minimising the amount of parts and the amount of tools required for mounting and/or demounting and maintenance.

The invention is not limited to the embodiment as described above, which can be varied in many ways within the scope of the invention as defined in the claims.

What is claimed:

1. An operating mechanism for two panel-shaped elements which are movable, substantially in the plane in which they extend, between an operative position, in which they lie side by side in the same plane, and a parallel, stacked position, and which each co-operate with guideways by guide elements at their transverse sides extending parallel to the direction of movement, wherein a first panel-shaped element is provided with a connecting pin, which engages in a curved guide track formed in the second panel-shaped element, which curved guide track is so configured that when a force is exerted on the second panel-shaped element for the purpose of moving said second panel-shaped element, a force comprising a force component transversely to the guideways will be exerted on the connecting pin, and in that the guideways comprise a transverse guideway portion connecting thereto.

2. The operating mechanism according to claim 1, wherein the first panel-shaped element comprises two guide elements on each transverse side and in that the distance between one end of each of the guideways and the respective transverse guideway portion corresponds to the distance between said two guide elements.

3. The operating mechanism according to claim 1, wherein the curved guide track of the second panel-shaped element comprises a sloping starting portion and a portion connecting thereto, which extends parallel to the plane of the panel-shaped elements.

4. The operating mechanism according to claim 2, wherein said end of the guideways, which is inclined, is present on the same side of the guideway in question as the transverse guideway portion.

5. The operating mechanism according to claim 1, wherein at least a number of the guide elements of the panel-shaped elements are biased against the guideways.

6. The operating mechanism according to claim 1, wherein the guide elements of the second panel-shaped element comprise guide rollers biased by spring elements.

7. The operating mechanism according to claim 1, wherein the guide elements of the first and second panel-shaped elements engage in the same guideways.

8. The operating mechanism according to claim 1, wherein the sides of the panel-shaped elements that face each other in the operative position thereof define a ventilating channel between them.

9. The operating mechanism according to claim 8, wherein said sides are configured such that the ventilating channel is curved so as to avoid the presence of a line of sight between the adjoining panel-shaped elements.

10. The operating mechanism according to claim 1, wherein said panel-shaped elements are sun screens in an open roof construction for a vehicle.

11. The operating mechanism according to claim 2, wherein at least a number of the guide elements of the panel-shaped elements are biased against the guideways.

12. The operating mechanism according to claim 3, wherein at least a number of the guide elements of the panel-shaped elements are biased against the guideways.

13. The opeating mechanism according to claim 4, wherein at least a number of the guide elements of the panel-shaped elements are biased against the guideways.

* * * * *